United States Patent
Cozzo (10) Patent No.: US 8,094,701 B2
(45) Date of Patent: Jan. 10, 2012

(54) CHANNEL ESTIMATION FOR HIGH DATA RATE TRANSMISSION USING MULTIPLE CONTROL CHANNELS

(75) Inventor: Carmela Cozzo, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 664 days.

(21) Appl. No.: 12/023,607

(22) Filed: Jan. 31, 2008

(65) Prior Publication Data

US 2009/0196333 A1 Aug. 6, 2009

(51) Int. Cl.
*H04B 3/46* (2006.01)
*H04B 17/00* (2006.01)
*H04Q 1/20* (2006.01)

(52) U.S. Cl. .......................... 375/147; 375/340

(58) Field of Classification Search .................. 375/340, 375/147, 150, 152; 370/342, 329, 335, 441; 455/67.13
See application file for complete search history.

(56) References Cited

U.S. PATENT DOCUMENTS

| | | | |
|---|---|---|---|
| 2002/0122471 A1* | 9/2002 | Ling | 375/147 |
| 2003/0099306 A1* | 5/2003 | Nilsson et al. | 375/316 |
| 2005/0152478 A1 | 7/2005 | Jalloul et al. | |
| 2005/0201447 A1 | 9/2005 | Cairns et al. | |
| 2007/0098115 A1* | 5/2007 | Bachl et al. | 375/343 |
| 2007/0121554 A1* | 5/2007 | Luo et al. | 370/335 |
| 2007/0253450 A1* | 11/2007 | Kuroda et al. | 370/500 |
| 2008/0205329 A1* | 8/2008 | Dominique et al. | 370/328 |
| 2010/0149990 A1* | 6/2010 | Kim | 370/241 |

FOREIGN PATENT DOCUMENTS

| | | |
|---|---|---|
| EP | 1229668 A2 | 7/2002 |
| EP | 1480350 A1 | 11/2004 |
| WO | 00/70773 A2 | 5/2000 |
| WO | 2007/016553 A1 | 2/2007 |

OTHER PUBLICATIONS

Tao Luo and Young-Chai Ko, "Pilot Diversity Channel Estimation in Power-Controlled CDMA Systems", Mar. 2004, IEEE.*
3GPP TS 25.213, V7.2.0 (May 2007). 3rd Generation Partnership Project; Technical Specification Group Radio Access Network; Spreading and modulation (FDD) (Release 7).
3GPP TS 25.104, V7.7.0 (Jun. 2007). 3rd Generation Partnership Project; Technical Specification Group Radio Access Network; Base Station (BS) radio transmission and reception (FDD) (Release 7).
Bottomley, Gregory E. et al. "A Generalized RAKE Receiver for Interference Suppression." IEEE Journal on Selected Areas in Commmunications, vol. 18, No. 8, Aug. 2000, pp. 1536-1545.

* cited by examiner

*Primary Examiner* — Chieh M Fan
*Assistant Examiner* — Aristocratis Fotakis
(74) *Attorney, Agent, or Firm* — Coats & Bennett, P.L.L.C.

(57) ABSTRACT

For high rate data transmission, channel estimates may be computed using multiple control channels. An exemplary method comprises determining a transmission parameter for a data channel, generating first and second channel estimates derived respectively from first and second control channels, and selectively combining the first and second channel estimates to generate a combined channel estimate. In some embodiments, the second channel estimate may be used to refine the first channel estimate before the selection of the final channel estimate.

16 Claims, 6 Drawing Sheets

FIG. 7

CHANNEL ESTIMATION FOR HIGH DATA RATE TRANSMISSION USING MULTIPLE CONTROL CHANNELS

BACKGROUND

The present invention relates generally to channel estimation in mobile communication networks and, more particularly, to channel estimation with multiple control channels for high data rate transmission.

Wideband Code Division Multiple Access (WCDMA) Systems are merging as a leading global Third Generation (3G) standard for mobile communication networks. 3GPP Release 6 of the WCDMA standard introduced a number of enhancements in the uplink including fast scheduling and hybrid ARQ with soft combining in order to achieve higher data rates in the uplink. To support the enhancements to the uplink, Release 6 introduced a new transport channel called the Enhanced Dedicated Channel (E-DCH) which corresponds to a set of separate channelization codes for data and associated control signaling. The Enhanced-Dedicated Physical Data Channel (E-DPDCH) carries the data. Depending on the data rate, the number of E-DPDCHs and their spreading codes are varied. The Enhanced Dedicated Physical Control Channel (E-DPCCH) is used to indicate the transport block format (e.g., E-TFCI symbols), which is needed to demodulate and decode signals transmitted on the E-DPDCHs. The E-DPCCH carries also information for Hybrid Automatic Repeat-reQuest (ARQ) and scheduling.

In Release 7 higher order modulation (16 QAM in the uplink) was introduced to improve the peak data rate. Higher data rates are achieved at high signal-to-noise ratios. To ensure reliable demodulation at these higher data rates, the Dedicated Physical Control Channel (DPCCH), which carries the pilot symbols used for channel estimation, need to be transmitted at higher power. However, increasing the transmit power on the DPCCH increases the amount of interference to other users and reduces system capacity.

To avoid increasing the transmit power on the DPCCH for high data rate users, the E-DPCCH may be used as a pilot signal for channel estimation. Release 7 of the WCDMA standard introduced a new operating mode, referred to herein as the boosted E-DPCCH mode, wherein the transmit power on the E-DPCCH is boosted at high data rates to enable the E-DPCCH to be used as a pilot signal. Because the E-DPCCH is transmitted only when the E-DPDCH is transmitted, the E-DPCCH causes less interference than caused by increasing the transmit power on the DPCCH, which is transmitted more frequently. During normal operation, the base station usually uses only the pilot symbols transmitted on the DPCCH for channel estimation. When operating in the boosted E-DPCCH mode, channel estimation from DPCCH may not be reliable.

SUMMARY

The present invention relates to channel estimation for mobile communication systems. The present invention provides methods for generating channel estimates using multiple control channels. In one exemplary embodiment, a channel estimator generates first and second channel estimates using first and second control channels, respectively. A combiner combines the first and second channel estimates to generate a combined channel estimate. A selector provides the combining weights and determines which channel estimate to output, depending upon transmission parameters, such as transport block size, power offsets, modulation, etc., and/or receiver parameters such as the estimated power of the control channels. The selector may select one of the first and second channel estimates, or a combined estimate, depending upon the transmission and/or receiver parameters.

In one exemplary embodiment, the combined estimate may be generated by scaling the first and second channel estimates with coefficients that depend on power offsets and/or received powers of the first and second control channels, respectively.

In another exemplary embodiment, the second channel estimate may be used as a reference estimate to refine or improve the first channel estimate. The first and second channel estimates may be used to compute estimation noise and channel statistics. The estimation noise and channel statistics may then be used to recompute the first channel estimates. The second channel estimate may be filtered over a predetermined estimation period. If the second channel estimate is not available in time for refinement of the first channel estimate in a current estimation period, refinement may be performed using a second channel estimate from a previous estimation period.

DETAILED DESCRIPTION

Referring now to the drawings, the present invention is described in the context of a WCDMA system. Those skilled in the art will appreciate, however, the methods and systems described herein may be applied in other types of mobile communication networks. Therefore, the following detailed description of an exemplary embodiment for a WCDMA system should not be interpreted to preclude use of the claimed invention with other network standards.

Figure 1:
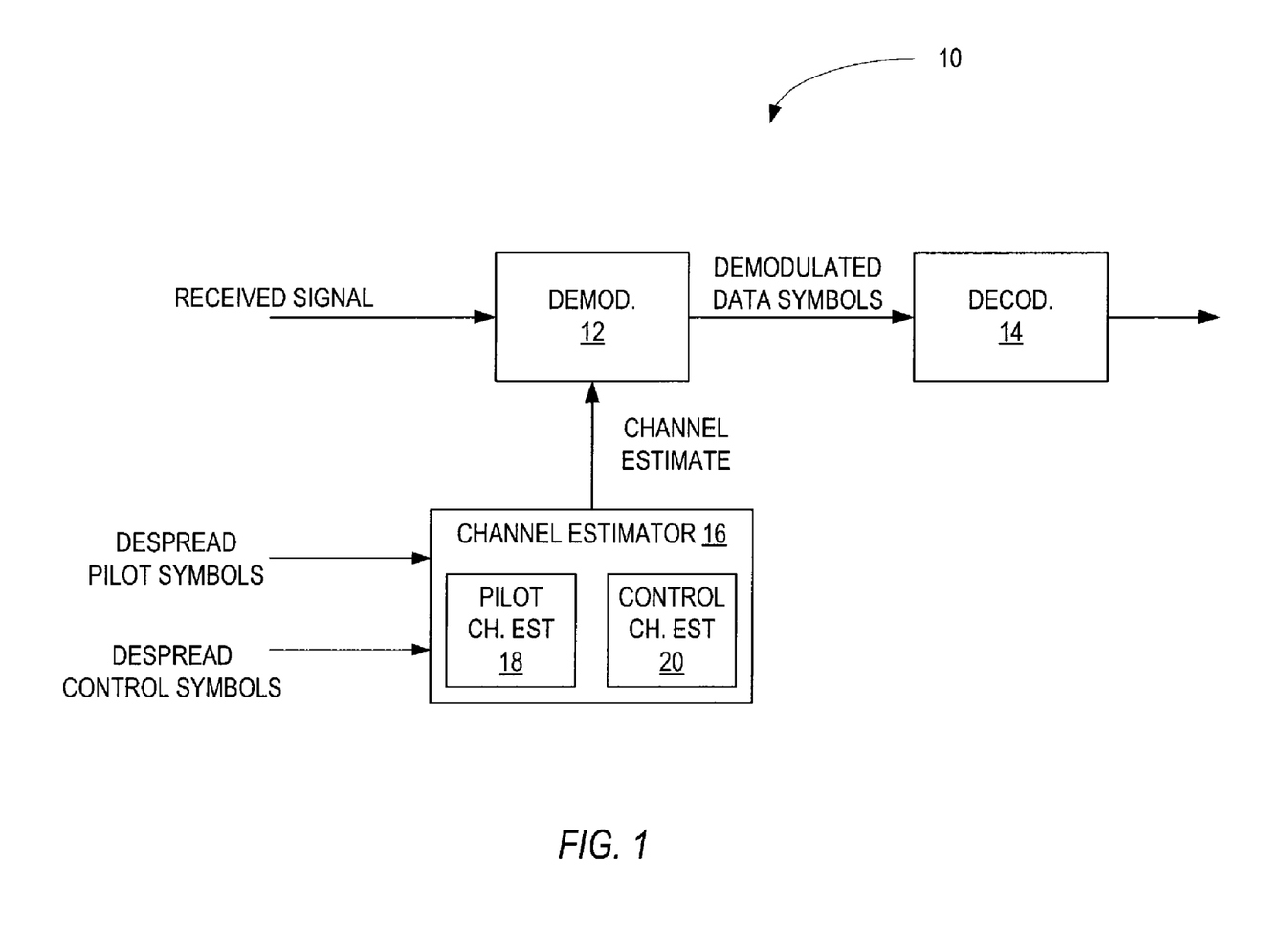
FIG. 1 illustrates the main functional components of a receiver according to an exemplary embodiment.

FIG. 1 shows a simplified diagram of an exemplary receiver 10 in a WCDMA system. The receiver 10 comprises a demodulator 12, decoder 14, and channel estimator 16. Demodulator 12 demodulates a received signal. The demodulator 12 may comprise, for example, a RAKE receiver, GRAKE receiver, or chip equalizer. Demodulated data symbols are output from the demodulator 12 to the decoder 14 for decoding. In the absence of decoding errors, the output of the decoder 14 is the same as the original information signal that was transmitted to the receiver 10. Channel estimator 16 provides an estimate of the channel between the transmitter and the receiver 10 to the demodulator 12 for use in demodulation. For example, if the demodulator 12 comprises a RAKE or GRAKE receiver, the channel estimates may be used to compute combining weights for combining RAKE finger outputs and/or impairment correlations. In WCDMA systems, the channel estimator 16 determines the channel estimates from a pilot signal transmitted on the Dedicated Physical Control Channel (DPCCH). Under certain circumstances described below, the channel estimator may use symbols transmitted on the Enhanced Dedicated Physical Control Channel (E-DPCCH) for channel estimation. However, the E-DPCCH symbols need to be first demodulated.

Channel estimator 16 comprises a pilot channel estimator 18 and a control channel estimator 20. Channel estimators 18 and 20 provide first and second channel estimates that are further processed and then sent to the demodulator 12. The pilot channel estimator 18 generates a set of pilot channel estimates based on the received pilot signal, which in WCDMA systems, is transmitted on the DPCCH. DPCCH comprises pilot and control symbols. Here it is assumed that the pilot channel estimates are obtained either from DPCCH pilot symbols only or from pilot and control DPCCH symbols. The control channel estimator 20 generates a set of control channel estimates based on the control signal transmitted on a separate channel, such as the E-DPCCH in WCDMA systems. Channel estimator 16 selectively combines the set of pilot channel estimates with the set of control channel estimates to generate a set of combined channel estimates for output to the demodulator 12. The channel estimator 16 selects a channel estimate to output depending on one or more transmission parameters, such as the transport block size, modulation, or data rate for the E-DPDCH. Power offsets or the received signal powers for the DPCCH and E-DPCCH may also be used to select the channel estimate. The power offsets may be considered to be transmission parameters of the E-DPDCH because the power offsets depend on and thus reflect the configuration of the E-DPDCH. Receiver parameters as the estimated received power of each channel may be also considered in the selection of the channel estimates.

At low data rates, the first channel estimate derived from the DPCCH is usually reliable and channel estimator 16 outputs the channel estimate to the demodulator 12. However, the pilot channel estimates derived from the DPCCH may not be reliable at high data rates. Therefore, a second channel estimate derived from the E-DPCCH may be used to obtain more accurate channel estimates and improve performance of the demodulator 12.

Release 7 of the WCDMA standard introduced a new operating mode called the boosted E-DPCCH mode in which the transmit power of the E-DPCCH is increased so that the E-DPCCH may be used as a pilot signal for channel estimation at high data rates. Increasing the transmit power on the E-PDCCH is preferable to increasing the transmit power on the DPCCH because the E-DPCCH is transmitted less frequently, and therefore, the impact on capacity is reduced and the interference to other channels and other users is reduced. The boosted E-DPCCH mode is triggered at a particular transport block size of the E-DPDCH and is typically used for high data rates.

When operating in the boosted E-DPCCH mode, the gain factor for the E-DPCCH can be much greater than the gain factor for the DPCCH. Consequently, the control channel estimate derived from the E-DPCCH is likely to be more accurate than the pilot channel estimate derived from the DPCCH. Combining the pilot channel estimate with the control channel estimate to obtain a combined channel estimate is likely to degrade performance as compared to using the control channel estimate alone. Therefore, the channel estimator 16 may output the control channel estimate to the demodulator 12 when operating in boosted E-DPCCH mode for high data rates The channel estimator 16 may output either the pilot channel estimate, the control channel estimate, or the combined estimate depending on transmission parameters, channel conditions, and/or other factors. At very low data rates, the pilot channel estimate will likely be sufficient by itself to achieve acceptable performance by the demodulator 12. As the data rate increases, it may be beneficial to combine the control channel estimate with the pilot channel estimate to obtain a combined channel estimate, and the channel estimator 16 may select and output the combined channel estimate in the normal E-DPCCH mode depending on the transmission parameters. The selection may be based on the transport block size, power offsets, modulation, or on a combination of these transmission parameters. As a simple example, the channel estimator 16 may select and output the combined channel estimate when the transport block size is lower than or equal to a predetermined combining threshold, which would be lower than or equal to the transport block size for which E-DPCCH boosting would be used.

Figure 2:
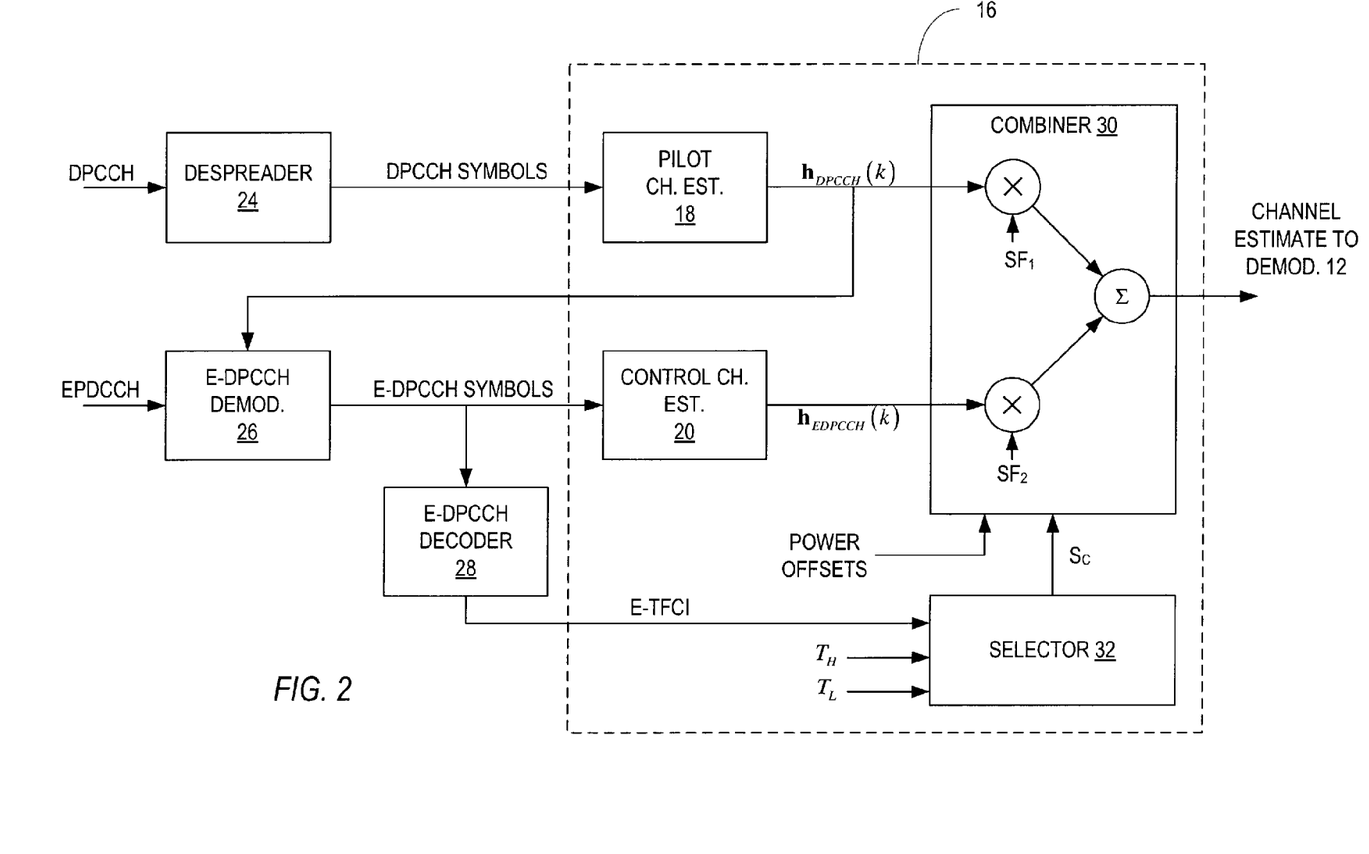
FIG. 2 illustrates an exemplary channel estimator according to one embodiment.

FIG. 2 illustrates in greater detail exemplary signal processing for selecting and/or combining channel estimates as described above. A despreader 24 despreads the received DPCCH signal to obtain despread pilot symbols. The despreader 24 is part of the demodulator 12 shown in FIG. 1. The pilot channel estimator 18 generates pilot channel estimates based on the despread pilot symbols. An E-DPCCH demodulator 26 demodulates the E-DPCCH symbols using the pilot channel estimates. Control channel estimator 20 uses the E-DPCCH symbols to generate a control channel estimate. The E-DPCCH symbols are also input to an E-DPCCH decoder 28. The E-DPCCH decoder 28 decodes the E-DPCCH symbols and outputs the E-TFCI to a selector 32.

The pilot channel estimate and the control channel estimate are input to a combiner 30. In the embodiment illustrated, the selector 32 selects one or both of the channel estimates to use based on the transport block size information obtained by decoding the E-TFCI bits, which is provided by the E-DPCCH decoder 28. A selector 32 generates a control signal $S_c$ to control the combiner 30. The control signal $S_c$ indicates to the combiner 30 which channel estimates to output based on the transport format. The selector output is based on the transport block size, and threshold $T_H$ and threshold $T_L$. When the transport block size equals or exceeds threshold $T_H$, combiner 30 outputs the control channel estimate. When the transport block size value is between threshold $T_H$ and $T_L$, combiner 30 combines the pilot channel estimate and outputs the combined channel estimate. When the transport block size is less than the threshold $T_L$, the combiner 30 outputs the pilot channel estimate. The channel estimate output by the combiner 30 is provided to the demodulator 12 for use in demodulating the E-DPDCH. Alternatively the modulation can be used as the criterion for selecting the pilot channel estimate or the control channel estimate. In that case the combiner 30 outputs the pilot channel estimate if BPSK was used. If 16 QAM was used, the combiner 30 outputs the control channel estimate.

Assuming the pilot channel estimate and control channel estimate have already been scaled by the respective transmitter power offsets, combiner 30 prior to combining may scale the channel estimates to take into account the quality of the different channel estimates. In general, greater weight may be given to estimates deemed to be of higher quality and lesser weight may be given to channel estimates deemed to be of lower quality. In one exemplary embodiment, scaling factors $SF_1$ and $SF_2$ may be computed based on the power offsets for the DPCCH and E-DPCCH respectively, and/or the transport format. When no scaling is applied, the scaling factors may both be set equal to 1. When there is no combining, the scaling factor for the non-selected channel estimate may be set equal to 0.

Figure 3:
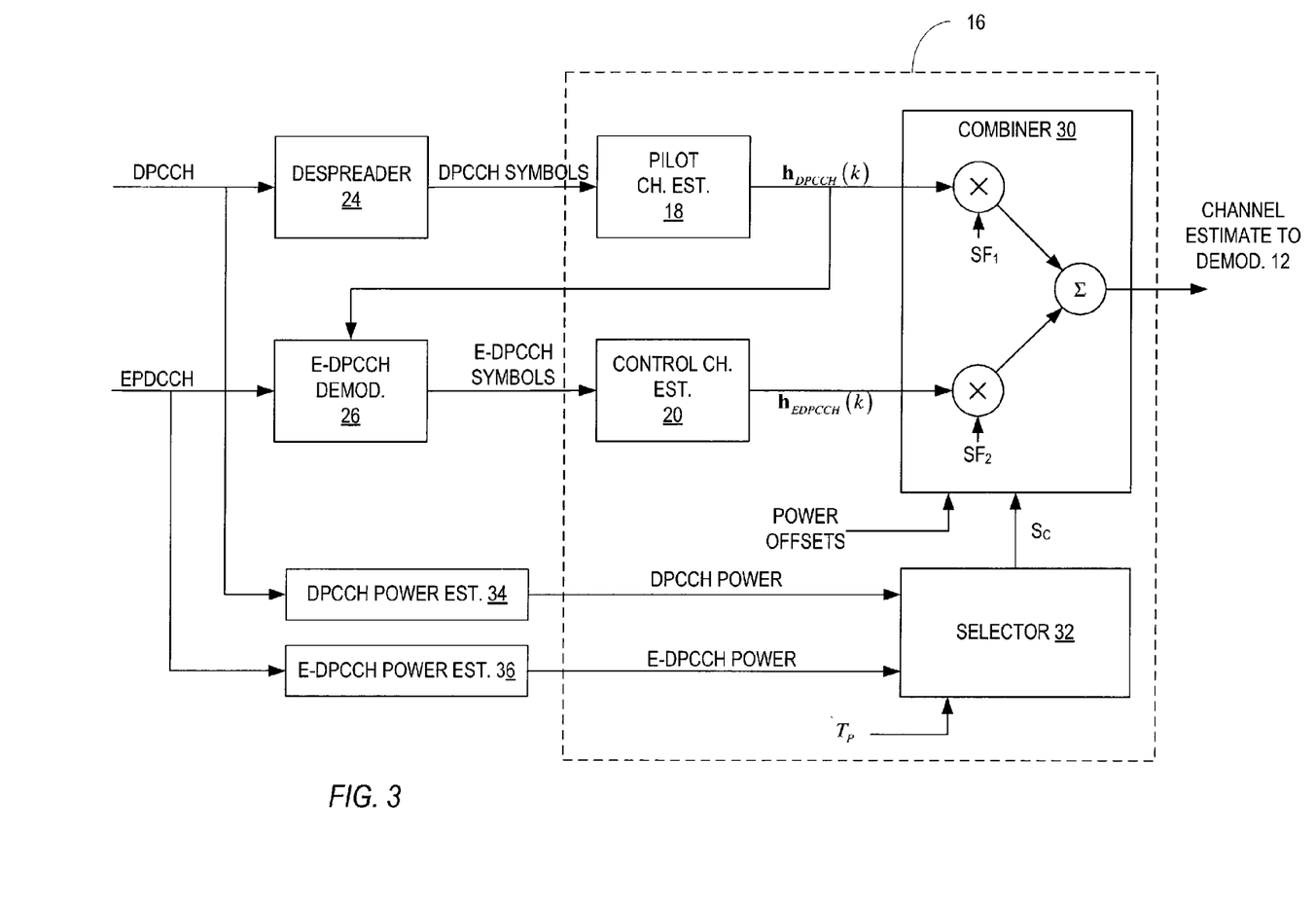
FIG. 3 illustrates an exemplary channel estimator according to another embodiment.

In another embodiment the selector 32 can select the channel estimate based on the estimated received powers of the DPCCH and E-DPCCH as shown in FIG. 3. In this embodiment, the despreader 24 generates pilot symbols and the E-DPCCH demodulator generates E-DPCCH symbols as previously described. The pilot symbols are input to the pilot channel estimator 18 and the E-DPCCH symbols are input to the control channel estimator 20. The combiner 30 selectively combines the pilot channel estimate and control channel estimate responsive to a control signal $S_C$ from the selector 32. Assuming the pilot channel estimate and control channel estimate have already been scaled by the respective transmitter power offsets, selector 32 computes the ratio of the received powers of the two channels and compares it to a threshold $T_P$. A DPCCH power estimator 34 estimates the received power of the DPCCH. An E-DPCCH power estimator 36 estimates the received power of the E-DPCCH.

In some embodiments, the control channel estimate may be used to refine the pilot channel estimate in situations where the control channel estimate is of higher quality than the pilot channel estimate, e.g., in boosted E-DPCCH mode. More specifically, the pilot and control channel estimates may be used to compute estimation noise statistics that, in turn, may be used to re-compute the pilot channel estimate with more accuracy.

Figure 4:
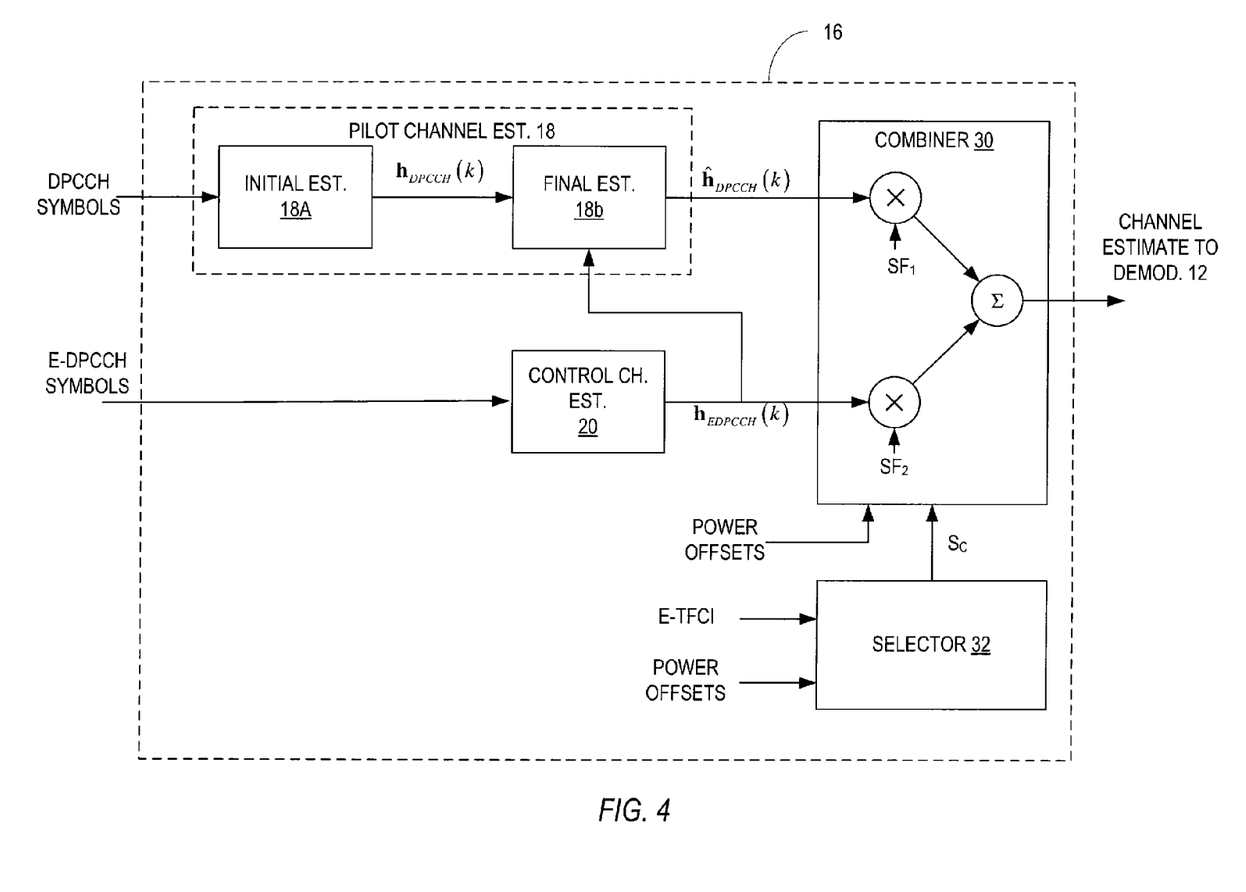
FIG. 4 illustrates an exemplary channel estimator according to another embodiment.

FIG. 4 illustrates an exemplary channel estimator 16 that uses the control channel estimate to refine the pilot channel estimate. The channel estimator 16 includes a pilot channel estimator 18, control channel estimator 20 combiner 30 and selector 32 which perform the functions previously described. In this embodiment, the pilot channel estimator 18 includes an initial estimator 18a and a final estimator 18b. The initial estimator generates an initial pilot channel estimate based on the received pilot symbols. The control channel estimator 20 generates a control channel estimate based on the demodulated control channel symbols. The control channel estimate is provided to the final estimator 18b, which uses the control channel estimate to further refine the initial pilot channel estimate.

Figure 5:
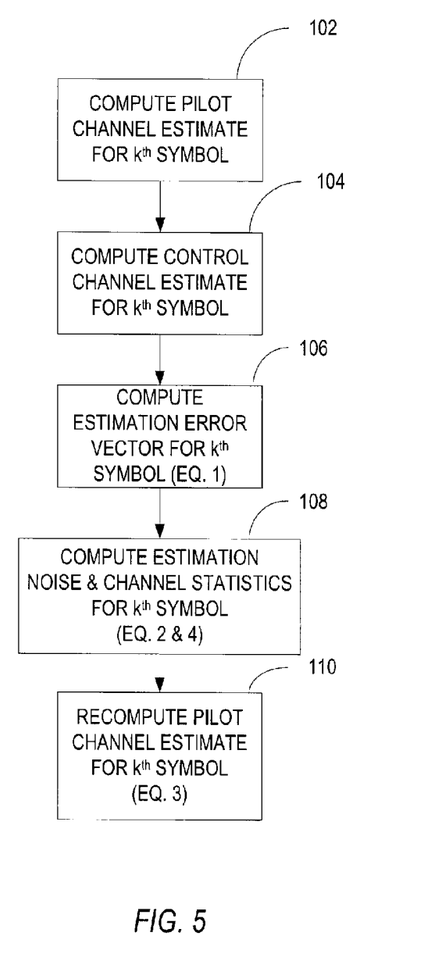
FIG. 5 illustrates a first exemplary method of refining a pilot channel estimate based on a reference channel estimate.

FIG. 5 illustrates an exemplary procedure for re-computing the pilot channel estimate according to one exemplary embodiment. In the following discussion, the pilot channel estimate for symbol k is denoted as $h_{DPCCH}(k)$ and the control channel estimate is denoted as $h_{EDPCCH}(k)$. The revised pilot channel estimate is denoted as $\hat{h}_{DPCCH}$. For each symbol k, the pilot channel estimate $h_{DPCCH}(k)$ and control channel estimate $h_{EDPCCH}(k)$ are computed (blocks 102 and 104). The processing represented by blocks 102 and 104 are performed respectively by the initial pilot channel estimator 18a and control channel estimator 20 in FIG. 4. It is assumed that the channel estimate from the E-DPCCH has already been scaled to take into account the different transmit powers of E-DPCCH and DPCCH, and reflect the DPCCH power. Next, an estimation error vector e(k) is computed (block 106). The estimation error vector e(k) may be given by:

$$e(k) = h_{DPCCH}(k) - h_{EDPCCH}(k). \qquad \text{Eq. (1)}$$

The estimation error vector e(k) is then used to compute an estimation noise statistic $R_e(k)$ as the outer product of the estimation error vector e(k) (block 108). The estimation noise statistic $R_e(k)$ may be given by:

$$R_e(k) = e(k)e^H(k). \qquad \text{Eq. (2)}$$

Finally, the estimation noise statistic $R_e(k)$ is used to re-compute the pilot channel estimate (block 110). The revised pilot channel estimate $\hat{h}_{DPCCH}$ may be computed according to:

$$\hat{h}_{DPCCH}(k) = A \cdot h_{DPCCH}(k) = R_c(k)[R_c(k) + R_e(k)]^{-1} h_{DPCCH}(k), \qquad \text{Eq. (3)}$$

where $R_c(k)$ is an estimate of the channel statistic given by:

$$R_c(k) = h_{EDPCCH}(k) h^H_{EDPCCH}(k) \qquad \text{Eq. (4)}$$

The matrix A depends on the channel statistics and the noise statistics and provides a form of MMSE estimation. In this approach, the control channel is treated as if it were the true channel and is used to compute estimation error vector e(k) and estimation noise statistics $R_e(k)$. The processing represented by blocks 106 through 110 is performed by the final pilot channel estimator 18b in FIG. 4.

Figure 6:
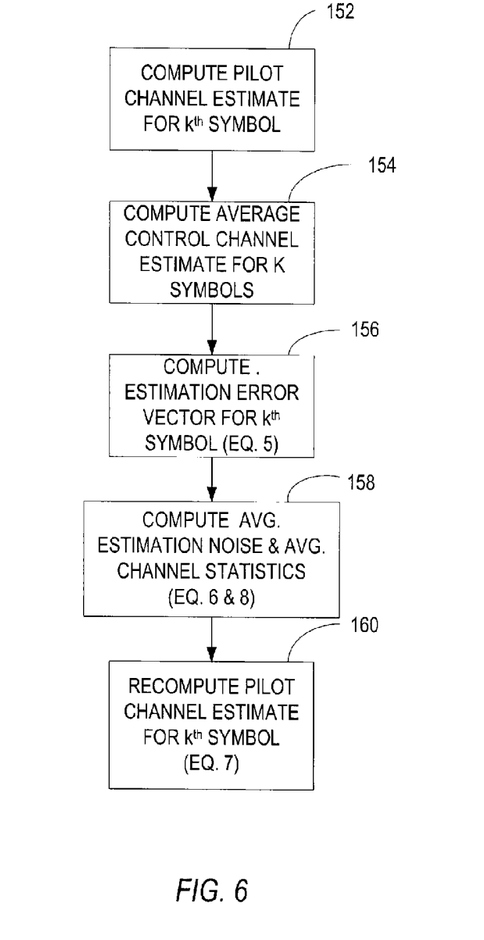
FIG. 6 illustrates a second exemplary method of refining a pilot channel estimate based on a reference channel estimate.

In the method shown in FIG. 5, the estimation noise statistics and channel statistics are computed independently for each symbol k. FIG. 6 illustrates an alternate method for re-computing the pilot channel estimate according to another exemplary embodiment wherein the estimation noise and channel statistics are averaged over a predetermined period comprising K symbols. As one example, K may comprise the number of symbols in one time slot. The method begins with the generation of the pilot channel estimate and the control channel estimate (blocks 152 and 154). The processing represented by blocks 152 and 154 are performed respectively by the initial pilot channel estimator 18a and control channel estimator 20 in FIG. 4. The estimation error vector e(k) is then computed as the difference between the DPCCH despread vector for the $k^{th}$ symbol $y_{DPCCH}(k)$ and a control channel estimate averaged over K symbols $h^{avg}_{EDPCCH}$ (block 156). The estimation error vector is given by:

$$e(k) = y_{DPCCH}(k) - h^{avg}_{EDPCCH}. \qquad \text{Eq. (5)}$$

The estimation error vector e(k) is then used to compute an average estimation noise statistic $R_e$ as the outer product of the estimation error vector e(k) averaged over the K symbols (block 158). The average estimation noise statistic $R_e$ may be given by:

$$R_e = \frac{1}{K-1} \sum_{k=1}^{K} e(k)e^H(k). \qquad \text{Eq. (6)}$$

Finally, the average estimation noise statistic $R_e$ is used to re-compute the pilot channel estimate for symbol k (block 160). The pilot channel estimate may be computed according to:

$$\hat{h}_{DPCCH}(k) = A \cdot h_{DPCCH}(k) = R_c[R_c + R_e]^{-1} h_{DPCCH}(k) \qquad \text{Eq. (7)}$$

where $R_c$ is the estimate of the channel statistic given by:

$$R_c = h_{EDPCCH} h^H_{EDPCCH} \qquad \text{Eq. (8)}$$

The processing represented by blocks 156 through 160 is performed by the final pilot channel estimator 18b in FIG. 4.

Further improvement may be realized by averaging the control channel estimation over multiple slots. The number of slots used for averaging may be selected depending on how fast the channel is changing and slots can belong to different TTIs. While the procedure has been described for improvement of the pilot channel estimate, the same approach may also be used to improve the control channel estimate using the pilot channel estimate as a reference in situations where the DPCCH is the strongest channel. The refined estimate computed as described above may be used to compute the combined estimate.

Figure 7:
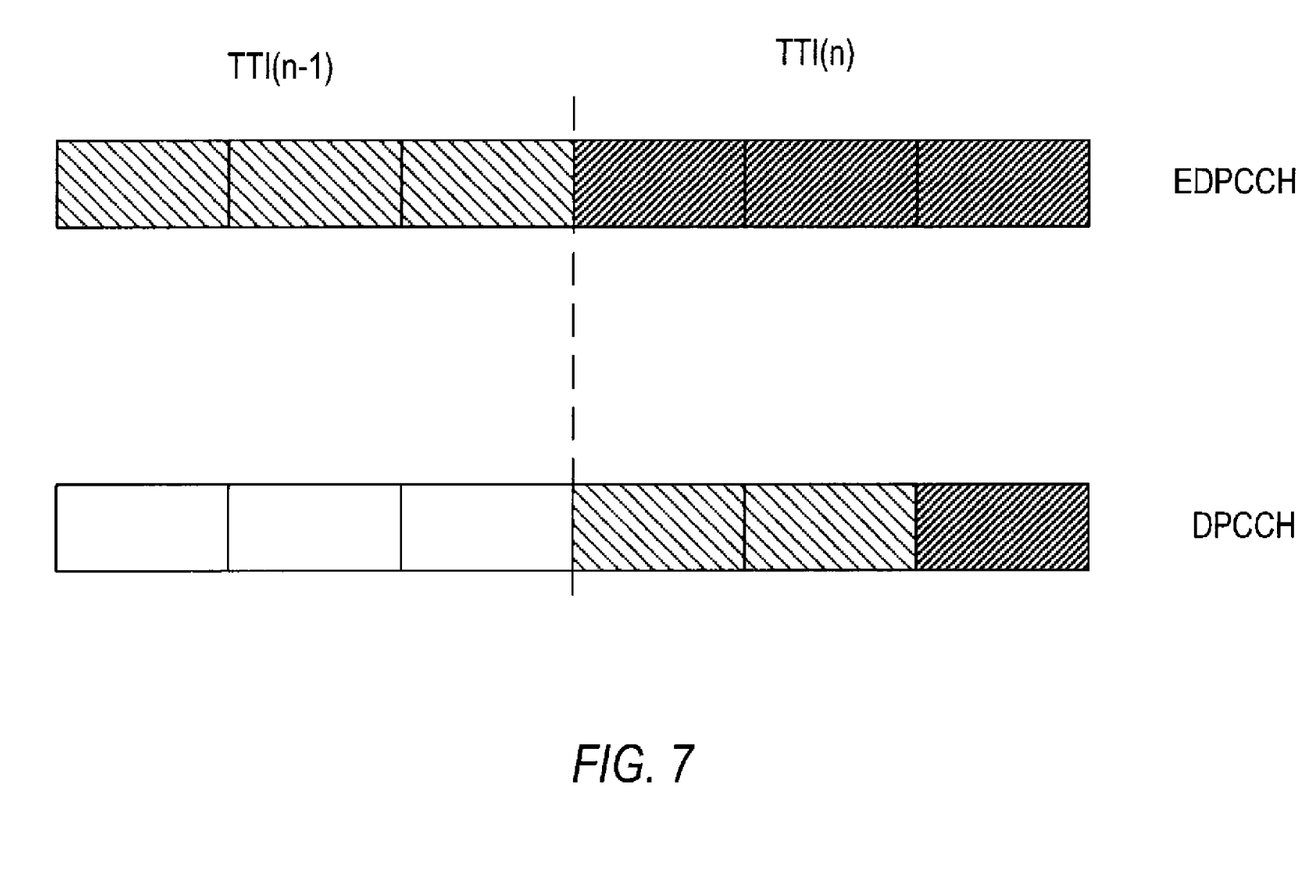
FIG. 7 illustrates a method for refining a pilot channel estimates using reference estimates from an earlier time period.

The improvement of the pilot channel estimate may be of interest for operations that are delay-sensitive. One example is the detection of the transmit power control (TPC) bits that are carried by the DPCCH, where the delay constraint may not provide sufficient time to process the E-DPCCH to obtain a better pilot channel estimate. In this case, the pilot channel estimate may be improved using the most recently available control channel estimate filtered over one or more slots. As an example, consider a 2 ms transmission time interval (TTI) having three slots as illustrated in FIG. 7. Assume that the delay constraint allows the pilot channel estimate for the first two slots in the $n^{th}$ TTI to be improved using the filtered control channel estimate from the n–$1^{th}$ TTI, and the pilot channel estimate for the third slot of the $n^{th}$ TTI to be improved using filtered control channel estimates available in the third slot of the $n^{th}$ TTI. Thus, for each slot of the $n^{th}$ TTI, the improved pilot channel estimate is given by:

$$\hat{h}_{DPCCH}(n,1) = R_c(n-1)[R_c(n-1)+R_e(n-1)]^{-1} h_{DPCCH}(n,1)$$

$$\hat{h}_{DPCCH}(n,2) = R_c(n-1)[R_c(n-1)+R_e(n-1)]^{-1} h_{DPCCH}(n,2),$$

$$\hat{h}_{DPCCH}(n,3) = R_c(n)[R_c(n)+R_e(n)]^{-1} h_{DPCCH}(n,3) \qquad \text{Eq. 9}$$

where $h_{DPCCH}(n,j)$ indicates the pilot channel estimate of slot j of the $n^{th}$ TTI and is obtained by averaging the despread pilot symbols or despread pilot and control DPCCH symbols. The channel statistics $R_c(n)$ are computed from the control channel estimate $h_{EDPCCH}$ of the $n^{th}$ TTI. A channel estimate for the $n^{th}$ TTI can be computed by averaging the channel estimates of each slot within that TTI and then the resulting channel estimate can be used to compute the channel statistics as $R_c(n) = h_{EDPCCH}(n) h^H_{EDPCCH}(n)$. Alternatively, the channel statistics can be averaged over the TTI. The error statistics are computed by averaging over K symbols as follows (K can be equal to the number of symbols in a TTI):

$$R_e(n) = \frac{1}{K-1} \sum_{k=1}^{K} e(k,n) e^H(k,n) \qquad \text{Eq. 10}$$

$$= \frac{1}{K-1} \sum_{k=1}^{K} [y_{DPCCH}(k,n) - h_{EDPCCH}(n)]$$

$$[y_{DPCCH}(k,n) - h_{EDPCCH}(n)]^H.$$

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating channel estimates, said method comprising:
   determining a transmission parameter for a data channel;
   generating an initial pilot channel estimate from a pilot signal received on a first control channel;
   generating a control channel estimate from demodulated control symbols received on a second control channel;
   computing noise statistics or channel statistics, or both, from said control channel estimate;
   generating a final pilot channel estimate using said initial pilot channel estimate and said noise statistics or channel statistics, or both;
   combining the final pilot and control channel estimates to generate a combined channel estimate; and
   selecting between said final pilot channel estimate, said control channel estimate, and said combined channel estimate depending on said transmission parameter.

2. The method of claim 1 wherein selecting between said pilot channel estimate, said control channel estimate, and said combined channel estimate depending on said transmission parameter comprises selecting said pilot channel estimate when said transmission parameter is less than a predetermined combining threshold, and selecting said combined estimate when said transmission parameter is greater than said predetermined combining threshold.

3. The method of claim 1 further comprising scaling said pilot channel estimate and said control channel estimate to form said combined channel estimate.

4. The method of claim 3 wherein said pilot channel estimate and said control channel estimate are scaled based on power offsets for said first and second control channels.

5. The method of claim 1 wherein said noise statistics and/or channel statistics for a current estimation period are generated using control channel estimates from a preceding estimation period.

6. The method of claim 1 wherein said transmission parameter comprises at least one of transport block size, power offsets, and modulation.

7. The method of claim 1 wherein selecting between said pilot channel estimate, said control channel estimate, and said combined channel estimate further depends on a receiver parameter.

8. The method of claim 2 wherein selecting between said pilot channel estimate, said control channel estimate, and said combined channel estimate further comprises selecting said combined channel estimate when transmission parameter is greater than said combining threshold and less than a second predetermined threshold, and selecting said control channel estimate when said transmission parameter is greater than said second predetermined threshold.

9. A channel estimator for a receiver, said channel estimator comprising:
   an initial pilot channel estimator to generate an initial pilot channel estimate from a pilot signal received on a first control channel;
   a control channel estimator to generate a control channel estimate from demodulated control symbols received on a second control channel and to compute noise statistics or channel statistics, or both, from said control channel estimate;
   a final pilot channel estimator to generate a final pilot channel estimate using said noise statistics or channel statistics, or both;
   a combiner to combine said final pilot and control channel estimates to generate a combined channel estimate; and
   a controller configured to determine a transmission parameter for a data channel and to select between said final pilot channel estimate, said control channel estimate, and said combined channel estimate depending on said transmission parameter.

10. The channel estimator of claim 9 wherein said controller is further configured to select said pilot channel estimate when said transmission parameter is less than a predetermined combining threshold, and to select said combined estimate when said transmission parameter is greater than said predetermined combining threshold.

11. The channel estimator of claim 9 wherein said combiner is configured to scale said pilot channel estimate and said control channel estimate to form said combined channel estimate.

12. The channel estimator of claim 11 wherein said pilot channel estimate and said control channel estimate are scaled based on power offsets for said first and second control channels.

13. The channel estimator of claim 9 wherein said channel estimator computes noise statistics and/or channel statistics for a current estimation period using second channel estimates from a previous estimation period.

14. The channel estimator of claim 9 wherein said transmission parameter comprises at least one of transport block size, power offsets, and modulation.

15. The channel estimator of claim 9 wherein the controller is configured to consider a receiver parameter to select between said pilot channel estimate, said control channel estimate, and said combined channel estimate.

16. The channel estimator of claim 10 wherein the controller is further configured to select said combined channel estimate when transmission parameter is greater than said combining threshold and less than a second predetermined threshold, and to select said control channel estimate when said transmission parameter is greater than said second predetermined threshold.

* * * * *